United States Patent [19]

Conrad

[11] 4,140,216
[45] Feb. 20, 1979

[54] TRACK ROLLER HAVING V-SHAPED HELICAL GROOVES

[75] Inventor: René A. Conrad, Woodside, Calif.

[73] Assignee: Dynaloc Corporation, San Mateo, Calif.

[21] Appl. No.: 775,719

[22] Filed: Mar. 9, 1977

[51] Int. Cl.² .................. B65G 23/04; B65G 39/16
[52] U.S. Cl. .................................. 198/835; 74/241; 198/840
[58] Field of Search ............... 198/780, 785, 840, 842, 198/835, 813; 74/240, 241; 226/15, 190; 193/37

[56] References Cited

U.S. PATENT DOCUMENTS

| 685,680 | 10/1901 | Galloway et al. ............... 198/840 |
| 1,678,925 | 7/1928 | Tackaberry ....................... 226/15 |
| 1,706,501 | 3/1929 | Smith ................................ 198/835 |
| 2,393,563 | 1/1946 | Petterson ......................... 198/835 |
| 2,701,430 | 2/1955 | Lorig ................................ 74/241 X |
| 3,283,981 | 11/1966 | Allen et al. ....................... 226/190 |
| 3,661,246 | 5/1972 | Faunce et al. ................... 198/842 X |
| 3,713,348 | 1/1973 | Conrad et al. ................... 74/240 |
| 3,772,931 | 11/1973 | Conrad et al. ................... 74/240 |
| 3,812,732 | 5/1974 | Conrad ............................. 74/240 |
| 3,888,131 | 6/1975 | Reid .................................. 74/241 |

FOREIGN PATENT DOCUMENTS

| 2358809 | 11/1973 | Fed. Rep. of Germany ........... 198/842 |
| 2511040 | 10/1975 | Fed. Rep. of Germany ........... 198/780 |

*Primary Examiner*—Robert B. Reeves
*Assistant Examiner*—James L. Rowland
*Attorney, Agent, or Firm*—Schatzel & Hamrick

[57] ABSTRACT

Ribbing configuration for use on a tracking roller for positive belt traction in which the roller's cylindrical surface has shallow V-shaped grooves defining lands which spiral oppositely outward from the center of the roller.

11 Claims, 5 Drawing Figures

U.S. Patent  Feb. 20, 1979  4,140,216
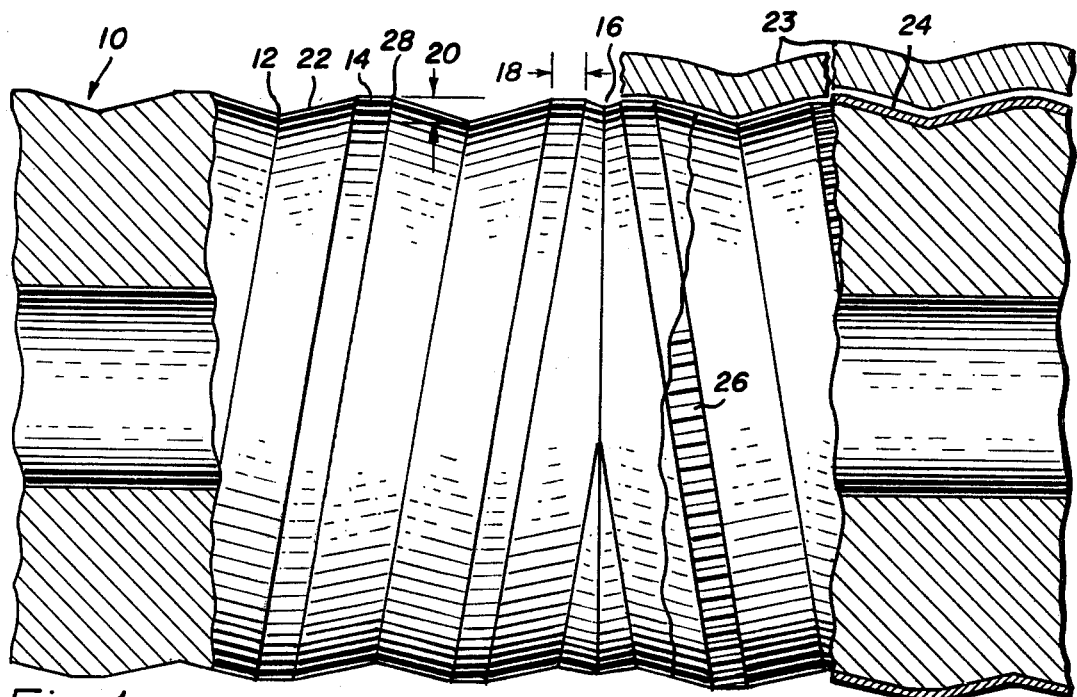
Fig_1
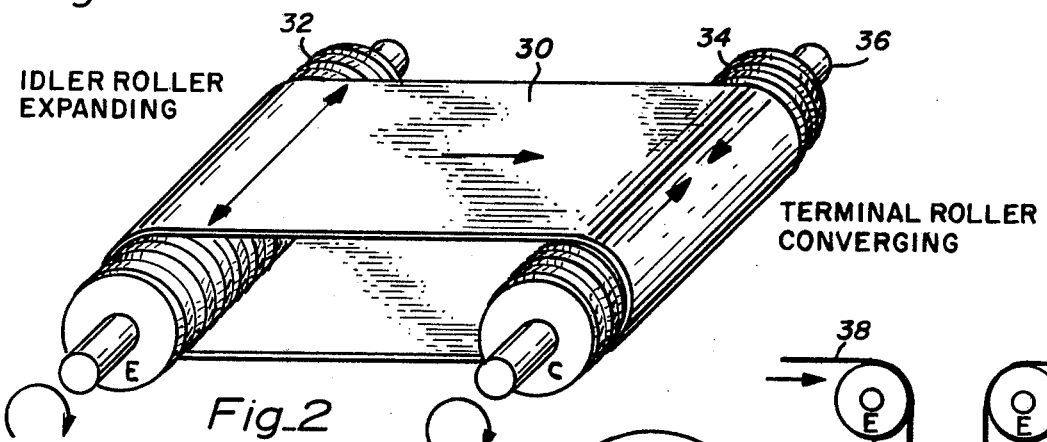
IDLER ROLLER
EXPANDING
TERMINAL ROLLER
CONVERGING
Fig_2
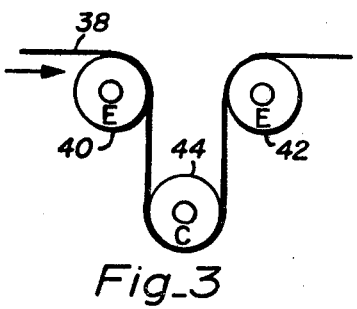
Fig_3
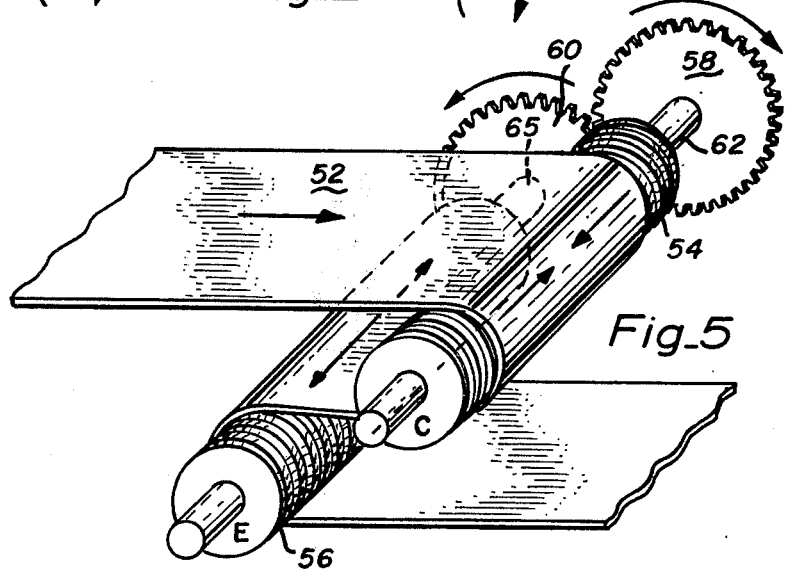
Fig_5
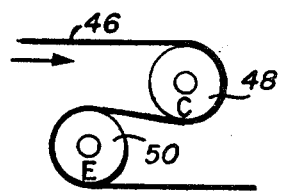
Fig_4

TRACK ROLLER HAVING V-SHAPED HELICAL GROOVES

BACKGROUND OF THE INVENTION

1. Field of the Invention

This invention relates to belt aligning and tracking rollers and more particularly to rollers having improved ribbing configuration providing increased traction.

2. Description of the Prior Art

Tracking and aligning of strips, belts and webbing material on rollers or pulleys have been universal problems. Crowned or tapered rollers are employed in an attempt to prevent the webbing from running sideways. Wormed surface rollers are also used with either inwardly and/or outwardly tending spiral ridges for centering and/or stretching the webbing material relative to the rollers. The narrow ridges, however, tend to lift the webbing, decreasing the contact area with the roller and thus decreasing the traction.

Heretofore, the problem has been approached in several different ways. One approach is to increase the number of narrow ridges on the roller to increase the surface area of contact. This increases the number of ridges per inch, or the pitch, decreasing the ridge angle. The decreased angle, however, decreases the tracking efficiency of the roller.

Another approach increases the coefficient of friction of the ridges themselves. Such an approach is disclosed in my earlier U.S. Pat. No. 3,812,732. In this disclosure tooth-like barbs are cut in the ridges. The difficulty with this approach is that it is not effective for all types of material. Another disadvantage is that the teeth tend to wear relatively rapidly.

SUMMARY OF THE PRESENT INVENTION

It is therefore an object of the present invention to provide a tracking roller with an improved ridge configuration increasing the roller traction.

Another object of the present invention is to provide a tracking roller with an improved ridge configuration which may be used with an increased helix angle for improved self centering.

Another object of the present invention is to provide a universal tracking roller with a ridge structure which may be used for tracking both continuous strip and belt webbing materials.

A further object of the present invention is to provide a universal tracking roller with a ridge structure which may be used for tracking all types of metal, cloth paper, plastic, woven wire, wire mesh, or other flexible web material which can be transported over rollers.

Still another object of the present invention is to provide an improved ridge structure having an increased service life.

Briefly, the preferred embodiment includes a roller having in its cylindrical surface shallow V-shaped grooves defining lands therebetween which spiral oppositely relatively the center of the roller. The lands may optionally contain serrations. The roller may additionally be coated.

It is therefore a material advantage of the present invention to provide a tracking roller with increased traction.

Another advantage is the ability to use the improved ridge structure with an increased helix angle, lower pitch, for improved self centering.

Another advantage is the ability to use the improved ridge structure to track all types of continuous strip or belt webbing materials.

A further advantage is the ability to use the improved ridge structure to track all types of metal, cloth, paper, plastic, woven wire, wire mesh, or other flexible web material which can be transported over rollers.

An additional advantage of the present invention is the increased service life afforded by the improved ridge structure.

These and other objects and advantages of the present invention will no doubt become apparent to those of ordinary skill in the art after having read the following detailed description of the preferred embodiment illustrated in the several figures of the drawing.

IN THE DRAWING

FIG. 1 is an enlarged fragmentary elevation of the center of a tracking roller in accordance with the present invention;

FIG. 2 is a perspective view generally illustrating a closed loop belt and roller system using center line tracking rollers constructed in accordance with the present invention;

FIG. 3 is a diagram of a three roller open loop continuous web system generally illustrating unwrinkling while tracking, using rollers in accordance with the present invention;

FIG. 4 is a diagram of a two roller open loop system generally illustrating unwrinkling while tracking, using rollers in accordance with the present invention; and FIG. 5 is an elevation of a two roller open loop continuous web system generally illustrating ironing out while tracking, using rollers in accordance with the present invention.

DETAILED DESCRIPTION OF THE PREFERRED EMBODIMENT

Referring now to the drawing, a preferred embodiment of a roller in accordance with the present invention is disclosed in FIG. 1 which includes a substantially cylindrical roller 10, having in its cylindrical surface a plurality of shallow V-shaped grooves 12 defining annular lands 14 therebetween which spiral oppositely relative the center 16 of the roller. Roller 10 is formed from a cylindrical section of aluminum or steel. Aluminum is usually chosen to produce a roller of lighter weight and lower inertia than steel which is less expensive than aluminum in larger sizes. However, particular applications or preference may require smaller rollers to be made of steel or other material such as rubber.

Grooves 12 are machined into the cylindrical surface of roller 10 so as to form lands 14 therebetween. Although the grooves are generally machined the roller could be formed in other ways, such as by explosion forming techniques. Lands 14 are usually one-eighth to three-sixteenths of an inch across 18, and the V-depth 20 is typically made between twenty and eighty thousandths of an inch deep. The gently sloping V-faces 22 tend to form a web, such as a belt or strip of material 23 to provide increase contact area between the web and the roller which increases the traction and decreases the roller wear. Shallow grooves are used for very rigid webs such as those of steel or other hard materials. The deeper grooves are used to track very pliable webs such as those of cloth or thin film materials.

The grooves are machined at an angle with respect to the circumference of the roller to produce lands which spiral in helical fashion relative the center of the roller. The helixes are uniform exact mirror images of each other with respect to the center of the roller. In other words, one or more left-hand helixes are formed in one side of the roller and an equivalent number of right-hand helixes are formed in the other side of the roller.

By machining the grooves to spiral inwardly with respect to the direction of rotation of the roller, a contracting roller is formed. When the contracting roller is used to drive the web the lands and faces of the V-shaped grooves urge the web in contact therewith inwardly toward the center of the roller tending to align and track the web. Specifically, at points along the lands and faces the roller exerts a force against the web in a direction perpendicular to the lands. These forces each have two rectangular components, a driving and a centering component. The driving components point in the direction of the roller rotation driving the web. The centering components are parallel to the axis of the roller and are directed toward the roller center. If the web is centered the centering components also point toward the web center, and being equal in number and magnitude on either side of the web center, they cancel. If however the web is not centered, the components do not point toward the web center resulting in a numeric imbalance, or net force, tending to center the web.

Because of the symmetry of rollers in accordance with the present invention, a contracting roller operates as an expanding roller when turned end for end or the direction of rotation is reversed. When the expanding roller is driven by the web it also tends to align and track the web. Specifically, the web exerts forces against the roller which cause the roller to rotate. In reaction the roller exerts equal and opposite forces against the web. The reaction forces have both a dragging and a centering component. The dragging components point in the direction opposite of the roller rotation. The centering components again point toward the center of the roller tending to align the web.

An optional coating 24 may be applied to the outer surface of the roller. The coating is used to decrease the wear, to change the coefficient of friction and to prevent corrosion of the roller surface. Usually stainless steel or carbon steel with a rockwell hardness of 67 on the C scale is applied to the outer surface of the roller by the use of flame coating or plasma spray technique. A flame with a temperature of approximately 3200° F. is used to melt wire or powder which is deposited on the roller surface. A ceramic coating may also optionally be used.

Optional, or knurling, serrations 26 may be cut into the land surface. The shape of the serrations may be varied to correspond to the type of web being used as discussed in my previous U.S. Pat. No. 3,812,732. Although now shown, it is understood that the optional serrations could be applied and then coated. The serrations could also be cut in the faces of the V-shaped grooves. Neither the serrations nor the metal coatings would be used, however, on rollers used to track thin films.

Although corners 28 of lands 14 are shown squared in shape, they may be slightly rounded since this occurs naturally through wear or when the surface is flame coated. Since the web never quite touches the bottom of grooves 12, the groove bottoms may also be slightly rounded.

Referring to FIG. 2, a closed loop centerline tracking system is shown generally to include a belt of webbing material 30 and two rollers 32 and 34. One roller is an expanding roller 32, which is usually the idler or tail roller. The other roller is a contracting roller 34 which is generally the driven roller, in which case shaft 36 of roller 34 is coupled by conventional means to a source of motivating power (not shown). Belt 30 has a total of 180° wrap around and in contact with the surface of each roller 32 and 34.

With rollers 32 and 34 rotating in the direction indicated by the arrows it can be seen that belt 30 runs in the direction shown. As roller 34 rotates, its lands turn screw fashion so as to converge toward the center of the roller. The traction of belt 30 against these inward converging lands causes the belt to remain centered relative to the rollers, as was discussed above. The ribbing on roller 32 is wound to pitch in a direction opposite that of roller 34. Thus, it will be seen that with a direction of rotation shown, the lands tend to turn in screw fashion expanding away from the center. The outwardly turning lands also tend to center the belt, as was also discussed above.

Positioning of the belt is accomplished by skewing slightly one of the rollers, increasing the tension on one side of the belt. The increased tension increases the belt to roller traction on the high tension side and decreases the traction on the low tension side. The traction imbalance causes the centering components, discussed above, to be greater in magnitude on the high tension side than on the low tension side. This causes the belt to move to the low tension side to a point where the components will again cancel.

The closed loop system of FIG. 2 using rollers in accordance with the present invention will track all types of belting material. Typically, belting such as regular, cable reinforced, balanced weave wire, sheet steel, or stainless steel belting may be used. The positive traction afforded by the ribbing configuration of the present invention permits the use of a pitch (the number of revolutions a land makes in one inch) of from one to one and one-half where before, a pitch of three was necessary. For thin film belting a pitch near three should be used for most applications. Since the roller control is a function of its rate of rotation, a lower pitch would be necessary for slow speed systems and a higher pitch could be used on high speed systems.

In addition to tracking, the rollers perform a belt cleaning function. Specifically, contaminants passing alternately over the expanding of contracting rollers are fractured by the criss-cross, or diamond, pattern imparted by the rollers. Next, the belt pressure forces the contaminant off the side of the belt. The positive traction of rollers in accordance with the present invention also makes possible a stable system using a flat driven roller in place of roller 34 of FIG. 2 if roller 32 is crowned. It has been found that a crown, or radial taper, of approximately sixty thousandth of an inch, each side of center, is sufficient for most roller lengths and types of belting material.

FIGS. 3 and 4 diagrammatically illustrate two embodiments of apparatus for unwrinkling while tracking a continuous sheet of webbing material, using rollers in accordance with the present invention. The unwrinkler of FIG. 3 is shown to include generally a continuous sheet of material 38, two expanding rollers 40 and 42, and a contracting roller 44. The axes of rollers 40 and 42 are disposed above and on either side of the axis of roller 44. Sheet 38 passes first over roller 40, then under roller 44 and finally over roller 42 making 90°, 180° and 90° wraps, respectively. Typically, for thin sheets of materials using rollers in accordance with the present invention, a pitch of two for the expanding rollers and three for the contracting roller is used.

Another embodiment of an apparatus for unwrinkling while tracking a sheet, using rollers in accordance with the present invention, is shown in FIG. 4. The unwrinkler includes generally a continuous sheet of material 46, a contracting roller 48 and an expanding roller 50. The rollers are disposed such that sheet 46 makes first a 180° wrap around roller 48 followed by a 180° wrap around roller 50. Typically, for thin sheets a pitch of three is used for the contracting roller and two for the expanding roller.

Wrinkles may develop in sheets for a number of reasons including matrix variations in the material, variations in the side-to-side diameter of a roller, and a roller being adjusted tighter on one side than the other. As such a wrinkle passes over roller 48, the wrinkle is divided by the lands on the roller into many smaller wrinkles which are absorbed into the roller grooves. Next, the greater angles (lower pitch) of the lands on roller 50 push the smaller wrinkles off of the sides of the sheet.

By using rollers of configuration in accordance with the present invention, unwrinklers such as those shown in FIGS. 3 and 4 are possible which not only unwrinkle sheets but simultaneously track the material.

A system for simultaneously ironing out sheets of material while tracking them is shown generally in FIG. 5. The apparatus includes a continuous sheet of material 52, a contracting roller 54 coupled to an expanding roller 56 by two gears 58 and 60. The rollers are disposed such that sheet 52 makes first a 180° wrap around roller 54 and then a 180° wrap around roller 56. The shafts 62 and 65 of rollers 54 and 56 are coupled together by conventional means such as gears 58 and 60. The gear ratio is such that roller 56 will turn slightly faster than roller 54.

The differential roller rotation rate causes roller 56 to slip. The lands on the slipping expanding roller rub or scuff the surface of the sheet tending to iron it out. This ironing out is accomplished simultaneously with tracking the sheet.

Although for brevity, particular configurations of unwrinkling and ironing out have been discussed other arrangements are possible. For example, rollers 40 and 42 of FIG. 3 could be contracting rollers and roller 44 be an expanding roller. It has been found, however, that best results are obtained if the last roller the sheet encounters is an expanding roller. The unwrinklers and ironer can also be used to unwrinkle or iron belts when incorporated into a closed loop system such as the closed loop system shown in FIG. 2.

It is further contemplated that after having read the preceding disclosure, other alterations and modifications of the present invention will become apparent to those skilled in the art, it is intended that the following claims be interpreted to cover all such alterations and modifications as fall within the true spirit and scope of the invention.

What is claimed is:

1. A conveyor system comprising:
    a first generally cylindrical roller having V-shaped grooves formed in the outer surface thereof and spiralling helically from the center of the roller to both ends thereof, said grooves being formed by facing inclined surface areas having substantially equal length along the axial direction of the roller and having a combination of groove width and pitch so as to form helical lands between adjacent loops of said grooves;
    a second generally cylindrical roller;
    a web carried by said first and second rollers, the engaging surface of said web contacting subatantially the entire covered surface of said grooves and said lands; and
    first means rotating said first roller about its axis whereby said V-shaped grooves exert a first outwardly tending force on said web between the center of said first roller and a first end thereof, and a second outwardly tending force on said web between the center of said first roller and a second end thereof, whereby the resultant engagement between the rollers and web tend to maintain said web centered relative to said first and second rollers.

2. A conveyor system as recited in claim 1 wherein said lands are serrated to increase the frictional engagement between said first roller and said web.

3. A conveyor system as recited in claim 1 wherein said first roller is a metallic body coated with a layer of material forming said outer surface and having a frictional coefficient different from that of said metallic body, said metallic body having a surface configuration substantially identical to that of said outer surface.

4. A conveyor system as recited in claim 1 wherein said first roller tapers slightly from its center to the respective ends thereof.

5. A conveyor system as recited in claim 1 wherein said second roller has V-shaped grooves formed in the outer surface thereof and spiralling helically from the center of the roller to both ends thereof, the grooves having a combination of groove width and pitch so as to form helical lands between adjacent loops of the grooves, said conveyor system further comprising second means rotating said second roller about its axis whereby said V-shaped grooves exert a third inwardly tending force on said web between the center of said second roller and a first end thereof and a fourth inwardly tending force on said web between the center of said second roller and a second end thereof.

6. A conveyor system as recited in claim 1 wherein said first roller, said second roller and said web are positioned such that said web continuously engages at least 180° of the surface of said first roller and at least 180° of the surface of said second roller.

7. A conveyor system as recited in claim 1 wherein said first roller, said second roller and said web are disposed relative to each other such that said web continuously engages at least 90° of the surface of said first roller and at least 180° of the surface of said second roller.

8. A conveyor system as recited in claim 7 and further including a third generally cylindrical roller disposed proximate said first and second rollers and relative thereto such that said web continuously engages approximately 90° of the surface of said third roller.

9. A conveyor system as recited in claim 8 wherein said third roller has a surface configuration identical to that of said first roller.

10. A conveyor system as recited in claim 1 wherein said first roller and said second roller are disposed proximate each other and are of substantially equal diameter and wherein said first and second rollers are rotatably coupled to each other such that said first roller rotates faster than said second roller, said second roller having a surface substantially identical to that of said first roller except that the V-shaped grooves formed in the outer surface thereof spiral inwardly from the ends of the roller toward the center thereof to unwrinkle and self-center the web.

11. A conveyor system as recited in claim 5 wherein said second means rotating said second roller comprises a motor means coupled to said second roller, said second roller driving said web, and where said second means rotating said first roller comprises said driven web.

* * * * *